Nov. 11, 1969  R. V. ALBERTSON  3,477,734
WHEEL MOUNTING ATTACHMENT FOR SKI-EQUIPPED VEHICLES
Filed Oct. 27, 1967  2 Sheets-Sheet 1

INVENTOR.
ROBERT V. ALBERTSON
BY
Merchant & Gould
ATTORNEYS

Nov. 11, 1969 R. V. ALBERTSON 3,477,734
WHEEL MOUNTING ATTACHMENT FOR SKI-EQUIPPED VEHICLES
Filed Oct. 27, 1967 2 Sheets-Sheet 2

INVENTOR.
ROBERT V. ALBERTSON
BY Merchant & Gould
ATTORNEYS

United States Patent Office 3,477,734
Patented Nov. 11, 1969

3,477,734
WHEEL MOUNTING ATTACHMENT FOR SKI-EQUIPPED VEHICLES
Robert V. Albertson, Navarre, R. Rte. Highway 19, Minneapolis, Minn. 55840
Filed Oct. 27, 1967, Ser. No. 678,608
Int. Cl. B62b *19/00, 13/18*
U.S. Cl. 280—11                 9 Claims

ABSTRACT OF THE DISCLOSURE

A wheeled attachment for a ski-equipped land vehicle, including a bracket attached to the ski mount of the vehicle and a supporting wheel-equipped crank arm mounted on the bracket, for positioning the wheel selectively in an inoperative storage position above a ski for travel on snow or ice, and an operative position below the ski for travel on dry ground.

---

An important object of this invention is the provision of an attachment as set forth which can be quickly and easily attached to the ski mountings of existing snowmobile vehicles without modification of the vehicles.

Another object of this invention is the provision of an attachment as set forth which can be positioned for snow or ground travel in a minimum of time and a minimum of effort.

Another object of this invention is the provision of a wheel-equipped attachment having means for positively locking the supporting wheel in both its inoperative and operative positions.

The above and still further highly important objects and advantages of this invention will become apparent from the following detailed specification, appended claims and attached drawings.

Referring to the drawings, which illustrate the invention, and in which like reference numerals indicate like parts throughout the several views.

Figure 1:
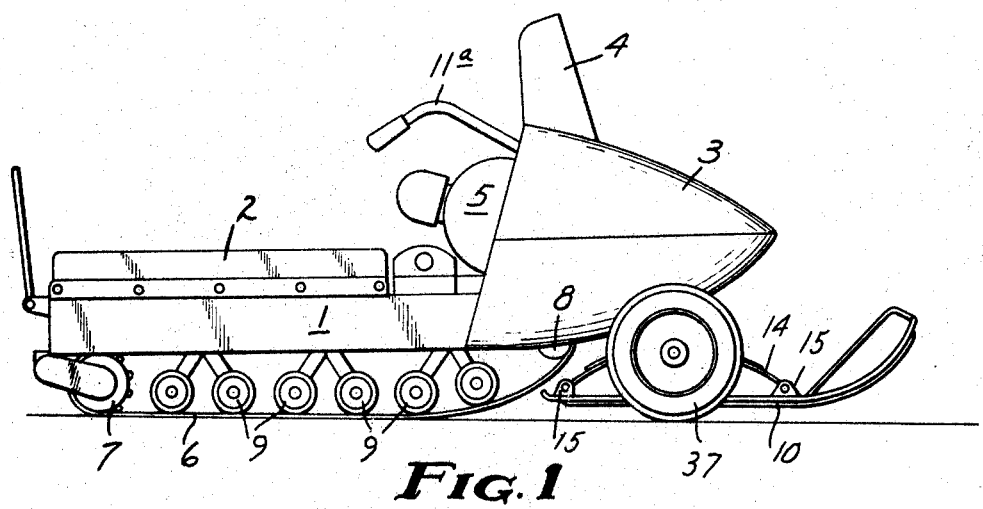
FIG. 1 is a view in side elevation of a ski-equipped vehicle, such as a snowmobile, having my wheel mounting attachment mounted thereon.
Figure 2:
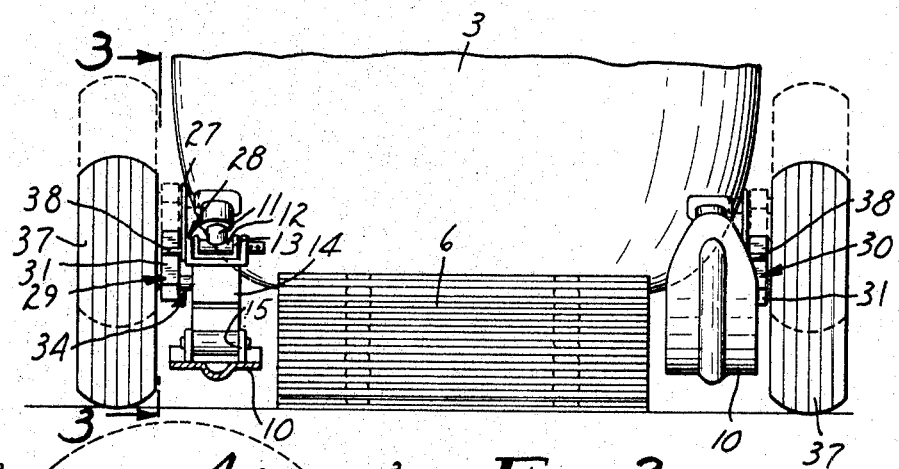
FIG. 2 is an enlarged fragmentary view in front elevation, some parts being broken away and some parts being shown in section.
Figure 3:
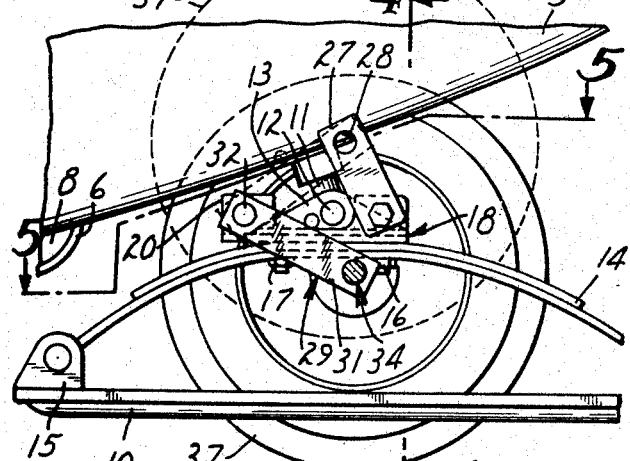
FIG. 3 is a fragmentary view, partly in side elevation and partly in section, taken substantially on the line 3—3 of FIG. 2.
Figure 4:
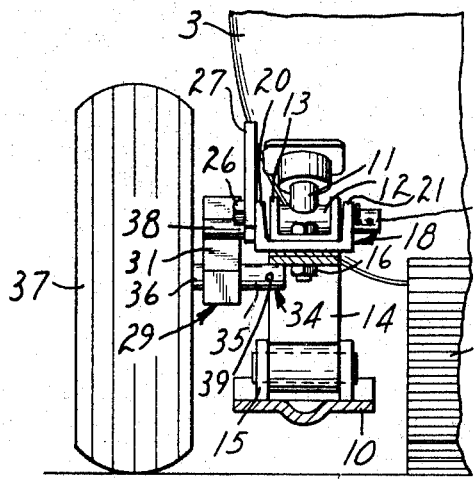
FIG. 4 is a fragmentary vertical section taken on the line 4—4 of FIG. 3.
Figure 6:
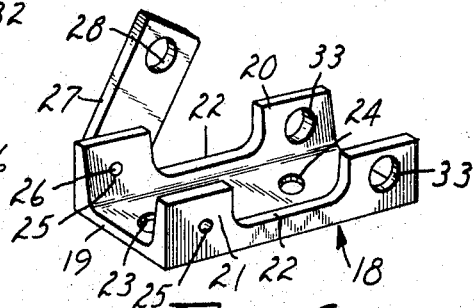
FIG. 6 is a view in perspective of the mounting bracket of FIGS. 1–5.
Figure 5:
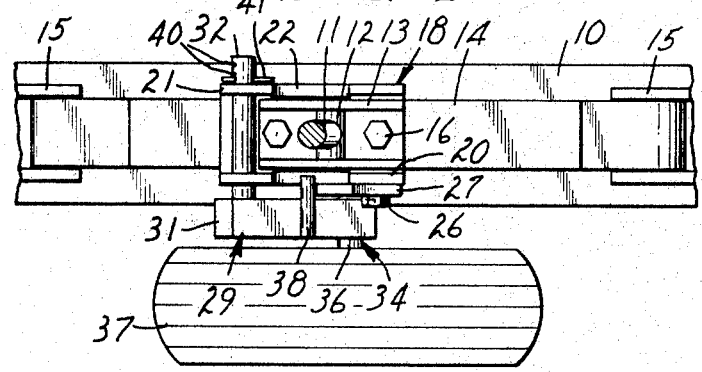
FIG. 5 is a fragmentary view partly in top plan and partly in horizontal section, taken on the line 5—5 of FIG. 3.

In the drawings, a conventional snowmobile is shown as comprising an elongated body 1 having a passenger supporting seat 2 thereon and a hood 3 at its front end. A windshield 4 projects upwardly from the hood 3, the hood at least partially covering a drive motor 5. The body 1 is at least partially supported by an endless drive belt 6 that is entrained over a drive sprocket 7 suitably journalled at the rear end of the body 1, and a wheel 8 near the front end of the body 1. A plurality of intermediate supporting wheels 9 are suitably connected to the body 1 and bear against the upper surface of the lower flight of the drive belt 6 to support the body 1 from the drive belt at longitudinally spaced points. The drive sprocket 7 is operatively connected to the engine or motor 5 by usual drive means, not shown. At its front end, the body 1 is supported by a pair of laterally spaced skis or runners 10 that are mounted on the body 1 for steering movements, by means of rotary legs or shafts 11 journalled in suitable bearings, the skis 10 being operatively connected to a handle bar 11a by conventional means not shown. Normally, the lower ends of the ski-supporting shafts 11 are provided with horizontally disposed cross-shafts 12 that are journalled in shoes 13 secured to the intermediate portions of leaf springs 14, the opposite ends of the leaf springs 14 being operatively connected to longitudinally spaced anchoring brackets or the like 15 on the skis for runners 10. Usually, the shoes 13 are constructed to permit limited swinging movements of the skis or runners 10 about the axis of their respective cross shaffs 12. The shoes 13 are rigidly but removably secured to their respective springs 14 each by a pair of nut-equipped front and rear mounting bolts or screws 16 and 17 respectively. The vehicle thus far described is of well-known construction, and in and of itself, does not comprise the instant invention. Hence, for the sake of brevity, further detailed showing and description thereof is omitted.

In the preferred embodiment of the invention illustrated in FIGS. 1–6, a pair of elongated channel-shaped mounting brackets 18 are provided, one for each of the skis or runners 10. Each bracket 18 comprises a bottom wall 19 and laterally spaced vertical side flanges 20 and 21 that are cut away intermediate their ends to provide upwardly opening notches 22. The bottom wall 19 is drilled to provide a pair of longitudinally spaced front and rear openings 23 and 24 respectively that are adapted to receive a respective one of the bolts 16 and 17. Each of the brackets 18 is adapted to be interposed between a respective one of the leaf springs 14 and its cooperating mounting shoe 13, the mounting shoes 13 being disposed between the side flanges 20 and 21, the notches 22 providing clearance for the opposite ends of the cross-shafts 12 of the steerable shafts 11. A pair of aligned screw threaded openings 25 are provided in the front end portions of the side flanges 20 and 21 for selective reception of a threaded screw or bolt 26 that is utilized to rigidly secure a lug 27 to a selected one of the flanges 20 and 21, the lugs 27 having recesses in the nature of openings 28 therethrough, for a purpose which will hereinafter be described.

A pair of cranks 29 and 30 are one each mounted on a different one of the brackets 18 in a manner now to be described, the cranks 29 and 30 being identical except that one is right-hand and the other is left-hand. Each crank 29 and 30 comprises a rigid radial crank-arm 31 having a crankshaft 32 rigidly secured to one end and projecting transversely in one direction from the crank arm 31, and journalled for rotation and axial sliding movements in a pair of aligned openings 33 in the side flanges 20 and 21 rearwardly of the rear opening 24. At their opposite ends, the crank arms 31 are each provided with shaft means 34 disposed in spaced parallel relationship to their respective crankshafts 32 and each comprising a relatively short supporting portion 35 that extends transversely of the crank arm 31 in the same direction as its respective crankshaft 32, and a relatively long axle portion 36 extending transversely outwardly of its respective crank arm 31 in a direction opposite that of its respective crankshaft 32. A pair of tire-equipped wheels 37 are journalled one each on each of the axle portions 36 in a well known and conventional manner.

The brackets 18 are mounted on their respective springs 14 with the lugs 27 thereof disposed adjacent the laterally outer edges of the springs 14. Also, as shown particularly in FIGS. 2 and 4, the cranks 29 are disposed laterally outwardly of their respective brackets 18. In the operative position of the cranks 29, wherein their respective wheels 37 engage the ground and support the skis 10 above ground level, the supporting portions 35 of the shaft means 34 underlies their respective brackets 18 and springs 14, the longitudinally intermediate portions of the springs resting on the supporting portions 35. Laterally inwardly projecting stop pins or the like 38 are welded or otherwise rigidly secured to the intermediate portions of the crank arms 31 and have inner end portions which overlie the bottoms of the notches 22 in their adjacent flanges 20 and 21 to limit downward swinging movement of their respective cranks 29 about the axes of their respective crankshafts 32. The stop pins 38 prevent the wheels 37 from swinging in a clockwise direction with respect to FIGS. 1 and 3 to a point where the wheels would otherwise be positioned rearwardly of their positions shown in FIGS. 1 and 3, which might otherwise occur when the vehicle is traveling over rough terrain and bouncing severely.

The wheels 37 are disposed in their above-described operative positions when it is desired to operate the vehicle on dry ground in the absence of snow or ice. The supporting portions 35 and crankshafts 32 are each provided with transverse apertures 39 and 40 for selective reception of a conventional retaining clip or cotter key 41 which engages the bracket 18 to prevent axially outward movement of the respective crank 29 relative to its bracket 18. When it is desired to operate the vehicle on snow or ice, the clips 41 are removed, and the wheels 37 with their respective cranks 29 are moved axially outwardly to a point where the inner ends of the supporting portions 35 are disposed laterally outwardly beyond the lugs 27. The cranks 29 are then swung upwardly until the supporting portions 35 are aligned with the recesses or opening 28 in their adjacent lugs 27, at which point the wheels 37 will be disposed above the skis or runners 10, as shown by dotted lines in FIGS. 2 and 3. The wheels 37 and their respective cranks 29 are then moved axially inwardly to cause insertion of the supporting portions 35 into their respective openings 28, and the clips 41 replaced either in the crankshafts 32 or supporting portions 35, as desired. Thus, the wheels 37 are quickly and easily placed in a storage position where they do not interfere with the proper operation of the vehicles on snow or ice.

It will be noted that the length of each crankarm 31 between the axes of its respective crankshaft 32 and axle portion 36 is not greater than the distance between the axis of the aligned openings 33 and the front mounting hole 23 in each bracket 18. In view of the fact that the steerable shafts 11 and mounting shoes 13 are pretty much standardized and uniform for most makes of snowmobiles, the length of the crankarms 31 relative to the front mounting hole 23 locates the axle portion 36 of each crank 29 so that it substantially intersects the axis of its respective steerable shaft 11 when its wheel 37 is in its vehicle supporting operative position. This arrangement makes for easy steering and control of the vehicles when traveling over dry ground.

Figure 7:
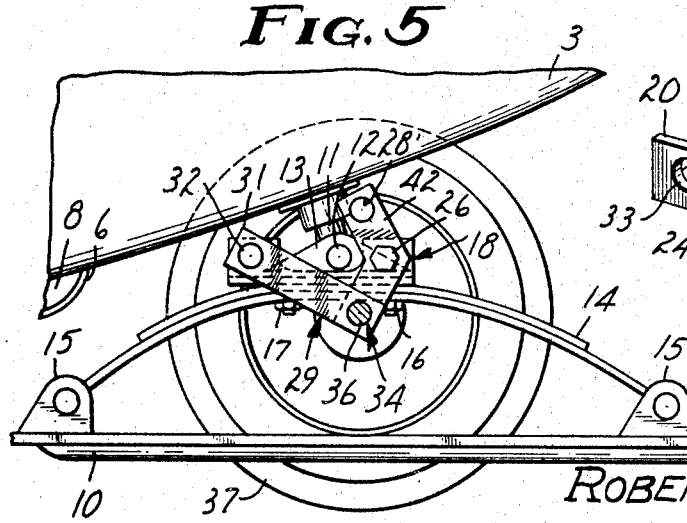
FIG. 7 is a view corresponding to FIG. 3 but showing a modified arrangement.
Figure 8:
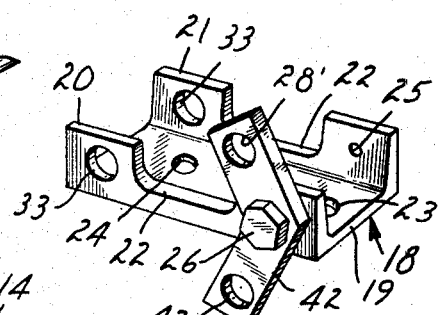
FIG. 8 is a view corresponding to FIG. 6 but showing the mounting bracket of FIG. 7.

In the modified form illustrated in FIGS. 7 and 8, an elongated lug 42 replaces the lug 27, the lug 42 having an upper recess or opening 28' for reception of the supporting portion 35 when the corresponding wheel 37 is in its inoperative storage position, and a second recess or opening 43 adjacent its lower end for reception of the supporting portion 35 of the adjacent crank 29 when its respective wheel 37 is in its operative vehicle supporting position. The channel-shaped bracket and crank illustrated in FIGS. 7 and 8 are identical to those of FIGS. 1–6, and the several parts thereof are identified by like reference numerals.

What is claimed is:

1. A wheel mounting attachment for a snowmobile having a body and body-supporting means, said body-supporting means including, a ski element, a spring on said ski element, and a mounting shoe connected to the spring and to said body, said attachment comprising:
    (a) a crank including:
        (1) a radial crank arm,
        (2) a crank shaft on one end of said crank arm,
        (3) and an axle on the other end of said crank arm parallel to said crank shaft;
    (b) a supporting wheel journaled on said axle;
    (c) bracket means adapted to be rigidly secured to said body-supporting means and having a transverse opening for reception of said crank shaft for movement of said crank arm disposing said wheel selectively in an inoperative position above the level of said ski element and an operative position below the level of said ski element;
    (d) said crank shaft and axle extending in opposite directions from said crank arm;
    (e) said crank shaft being axially slidably mounted in said transverse opening;
    (f) and means for releasably locking said crank arm in said operative position of the wheel comprising a supporting portion projecting outwardly from said crank arm in the same direction as said crank shaft.

2. The wheel mounting attachment defined in claim 1, in which said bracket means defines a recess for reception of said supporting portion responsive to rotary and axial movement of said crankshaft in a given direction, to support said wheel in said inoperative position in upwardly spaced relation to the ground.

3. The attachment defined in claim 1, characterized by a clip element for releasably locking said crankshaft in one position of axial movement thereof, one of said crank and supporting portion defining an aperture for said clip element, said clip element engaging a portion of said bracket means when received in said aperture.

4. The attachment defined in claim 1 in which said supporting portion underlies said bracket means in the operative position of said wheel, characterized by a stop element on said crank arm engaging said bracket means to limit rotary movement of said crank when said crank is moved in one direction of axial movement thereof.

5. The attachment defined in claim 1 in which said bracket means is elongated in a direction longitudinally of the ski and defines a pair of longitudinally spaced front and rear mounting holes for passage of bolts securing the spring means to the mounting shoe, said crankshaft receiving opening in the bracket means being rearwardly offset from said mounting holes, said crank arm having a radial length between said crankshaft and axle portion thereof not greater than the longitudinal distance between the axis of said crankshaft receiving opening and said front mounting hole.

6. The attachment defined in claim 1 in which said bracket means comprises an elongated upwardly opening channel member having laterally spaced generally vertical side flanges and extending longitudinally of the ski, said channel member being adapted to receive the ski mounting shoe between said side flanges, said crankshaft receiving opening comprising a pair of aligned apertures in said side flanges.

7. The attachment defined in claim 6 in which said crank arm is disposed laterally outwardly of one of said side flanges, characterized by an extension portion projecting upwardly from the side flange adjacent said crank arm and defining said recess.

8. The attachment defined in claim 7 in which said extension portion extends downwardly below the bottom of said channel member and defines a second recess for reception of said relatively short supporting portion when said crank is rotated to its wheel operative position.

9. The attachment defined in claim 1 in which said bracket means defines a second recess in downwardly spaced relationship to said first-mentioned recess for reception of said relatively short supporting portion, when said crank is rotated to its wheel operative position.

References Cited

UNITED STATES PATENTS 950,583  3/1910  Vicks _____ 280—11
2,468,271  4/1949  Ostby _____ 280—11

FOREIGN PATENTS 522,343  7/1921  France.
916,879  12/1946  France.

LEO FRIAGLIA, Primary Examiner
J. E. SIEGEL, Assistant Examiner

U.S. Cl. X.R.

180—5